United States Patent [19]

Bone

[11] 4,251,872
[45] Feb. 17, 1981

[54] DRILL MONITOR SYSTEM

[75] Inventor: Dale H. Bone, Phoenix, Ariz.

[73] Assignee: Honeywell Information Systems Inc., Phoenix, Ariz.

[21] Appl. No.: 12,679

[22] Filed: Feb. 16, 1979

[51] Int. Cl.³ .............................................. G06F 15/46
[52] U.S. Cl. .................................................... 364/551
[58] Field of Search .............. 364/474, 551, 508, 475, 364/476, 483; 73/7, 579, 104, 162

[56] References Cited

U.S. PATENT DOCUMENTS

| | | | |
|---|---|---|---|
| 3,694,637 | 9/1972 | Edwin et al. | 364/508 |
| 3,819,916 | 6/1974 | Watanabe | 364/475 X |
| 3,841,149 | 10/1974 | Edwin et al. | 364/508 X |
| 3,872,285 | 3/1975 | Shum et al. | 364/508 X |
| 3,891,835 | 6/1975 | Shoda et al. | 364/508 X |
| 4,057,713 | 11/1977 | Mette et al. | 364/476 |
| 4,109,312 | 8/1978 | Beutel | 364/550 X |
| 4,120,196 | 10/1978 | Hamilton et al. | 73/104 |

Primary Examiner—Edward J. Wise
Attorney, Agent, or Firm—T. W. DeMond; W. W. Holloway, Jr.; R. T. Reiling

[57] ABSTRACT

There is disclosed herein an apparatus for automatic monitoring of numerous high speed drill spindles on a numerically controlled drilling machine for purposes of immediate detection of the absence of drilling by a particular spindle because of a broken drill bit. The apparatus detects the absence of drilling, interrupts the automatic cycle of the drilling machine and alerts the operator. Power dissipation in each drill spindle motor is compared just prior to entry of the drill bit into the workpiece and after entry if any. If power dissipation increases above a predetermined threshhold level for all spindles, no interrupt is generated. If power dissipation does not increase in one or more spindle motors, comparator circuits alert a digital processor which interrupts automatic operation of the drilling machine and alerts the operator. Such a system eliminates the expense and error of human visual monitoring and generation of expensive scrap improperly processed before discovery of the broken bit.

14 Claims, 10 Drawing Figures

DRILL MONITOR SYSTEM

BACKGROUND OF THE INVENTION

The invention relates generally to the field of real time computer monitor applications and, more particularly, to applications in measuring and monitoring machine performance for quality control purposes.

Prior practice for broken bit detection involved visual monitoring of the drilling cycle of the numerically controlled drilling machines. When the operator detected a broken drill bit, he interrupted the automatic drilling cycle for replacement of the bit. The obvious disadvantage of this method was the lack of reliability due to lapses in the attention span of the operator. Further, the operator could monitor only one machine at a time. Therefore, costs were high and reliability was low. Often, large amounts of scrap were generated due to a broken drill bit going undetected. Workpieces that have been improperly processed are very difficult to repair since it is difficult to return the machine to the point in the program where the drill bit broke since the exact time it broke is not generally known.

The disclosed drill monitor system eliminates these problems by automating the monitoring process so that detection and interruption of the drilling process occurs immediately upon breakage of a drill bit. Concomitant cost savings due to more efficient distribution of labor and less waste improve the cost efficiency of manufacturing operations.

SUMMARY OF THE INVENTION

The heart of the invention is the drill monitor interface module which interfaces with a digital processor controlling the drilling machine. This drill monitor interface performs the function of monitoring the position of the drill bits in relation to the workpiece and sampling the power dissipation in the drill spindle motor at two times: Just prior to the entry of the drill bit into the workpiece and just after entry. The two samples are compared, and, if power dissipation in a particular drill spindle motor does not rise above a predetermined threshold level, it is assumed that no drill bit has entered the workpiece. A spindle power logic signal is produced for each spindle motor. Timing logic generates an interrupt to a digital processor after the comparison has been made, causing said digital processor to read the spindle power logic signals and stop the drilling if the spindle power logic signals indicate a drill bit has broken off.

In broad perspective, the motor monitor system is comprised of five major elements: A numerically controlled machine sensors, a drill monitor interface, a means for informing when mechanical loading should occur, and a digital processor. The numerically controlled machine utilizes electric motors to accomplish a particular task. The sensors are responsive to criteria indicative of whether mechanical loading of said electric motor has occurred and generate a first signal. The drill monitor interface receives the first signals from the sensors and processes them in preparation for analysis. Analysis by the drill monitor interface consists of sampling the sensor signals just prior to and again after theoretical loading of the electric motor should have occurred. The signals are compared and a HIT/MISS signal is generated for each motor monitored indicating whether loading of the motor occurred. When the HIT/MISS signals are all generated, an interrupt request is sent to the digital processor. The means for informing when mechanical loading should occur sends a signal to the drill monitor interface indicating approximately when loading should occur. It could be a limit switch or a timer. The digital processor receives the interrupt request from the drill monitor interface and is programmed to read the HIT/MISS signal and look for misses. If a miss is found a stop command is issued to the numerically controlled machine to prevent further automatic cycling.

The above functions will be more clearly understood from the following detailed description and upon consideration of the accompanying drawings of which:

DESCRIPTION OF THE PREFERRED EMBODIMENT

The following reference material and references incorporated or referred to therein are incorporated by reference in this disclosure:

(1) Revision B and subsequent revisions of the Honeywell Information Systems Automations Systems 8080A Microcomputer System Specification and all other diagrams and writings describing the system;
(2) Intel ® MCS-80 TM Users Manual, 1977;
(3) Intel ® Component Data Catalogue, 1978;
(4) Texas Instruments TTL Data Book for Design Engineers, 2d edition, 1976;
(5) Analog Devices Databook covering the AD536J RMS Converter;
(6) Intersil Databook covering the IH5041 Analog Switch and the IH5110 sample/hold chip; and
(7) Monsanto Databook covering the MCT6 optical isolator.

Figure 1:
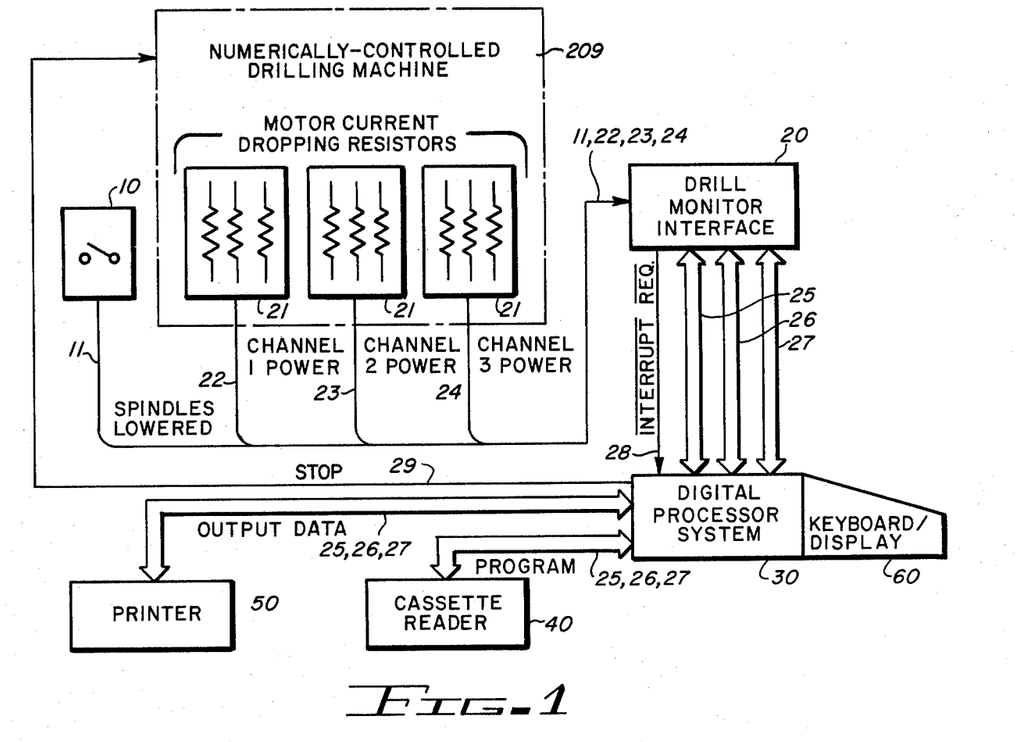
FIG. 1 is a block diagram of the overall drill monitor system.

In FIG. 1 the overall organization of the motor monitor system is illustrated. A numerically controlled drilling machine 209 automatically cycles workpieces through while drilling holes in them via numerous motors and electric motor driven drill spindles holding drill bits. Said drill spindles are under internal program control by the numerically controlled drilling machine. A means for informing the drill monitor interface when mechanical loading of the drill bits should occur is needed. Limit switch 10 serves this purpose in the preferred embodiment. Limit switch 10 is responsive to the mechanical position of the drill spindles of the numerically controlled drilling machine and serves to send a SPINDLES LOWERED signal over line 11 to timing logic 63 in drill monitor interface 20 just prior to entry of the drill bits into the workpiece. Approximately 80 milliseconds after receipt of this SPINDLES LOWERED signal, the drill bits should contact the workpiece. In the preferred embodiment, limit switch 10 is a Hall Effect switch having no moving contacts such as the Honeywell Microswitch, part number 37XL11XB-12. In other embodiments, other means for informing the drill monitor interface when mechanical loading should occur may be used in lieu of limit switches i.e., timers. The timing logic 63 in drill monitor interface 20 utilizes the SPINDLES LOWERED signal to control sample/hold circuits and to send an INTERRUPT REQ. signal on line 28 to digital processor 30 after generation of a HIT/MISS signal by said drill monitor interface 20 for each drill spindle. Digital processor 30 receives this interrupt request and enters a programmed routine to service drill monitor interface 20. These functions will be explained in more detail later.

Since a broken drill bit is detected in the preferred embodiment by comparing power dissipation in the spindle motors just prior to entry of the drill bits into the workpiece and again after such entry, some sensor or means for sensing power dissipation in the spindle motors is needed. Motor current dropping resistors 21 serve this purpose. In other embodiments, other criteria such as shaft RPM or bursts of infrared heat at the tip of the drill bits could be used. These resistors are connected in series with the phase windings of the three phase spindle motors. Since the spindle motors operate at a constant AC voltage, the AC phase current is directly proportional to power dissipation in the motors. Three resistors are used on each motor, one in series with each phase, to keep the spindle motor impedance in balance. Drill monitor interface 20 is connected by lines 22, 23 and 24 to one motor current dropping resistor 21 in each spindle motor and reads the AC voltage across the dropping resistors 21. These signals constitute the CHANNEL 1, 2 and 3 POWER signals on lines 22, 23 and 24 respectively.

A HIT/MISS signal is generated for each channel by drill monitor interface 20 and is transmitted over data bus 25 to digital processor 30. The HIT/MISS signals are true when power dissipation has increased above a predetermined threshold value representing the no load condition. Line 26 is the address bus and line 27 is the control bus.

A conventional digital processor 30 serves to coordinate all the activities of the drill monitor system in accordance with a program loaded from cassette reader 40. Printer 50 and keyboard/display 60 allow input and output of various reports, commands and messages to the operator. As noted earlier, timing logic 63 in drill monitor interface 20 sends an INTERRUPT REQ signal on line 28 to digital processor 30 causing it to branch to a portion of the internally stored program intended to service the drill monitor interface 20. In the preferred embodiment, a conventional vectored interrupt design is used for the design of the interrupt control logic in the digital processor 30.

Upon receipt of the INTERRUPT REQ signal on line 28, digital processor 30 is programmed to read and analyze the HIT/MISS signals for each motor being monitored (all active drill spindles). If any is found to be false indicating a miss or broken drill bit has occurred, the digital processor 30 alerts the machine operator and sends a STOP signal along line 29 to the stop circuits of the numerically controlled drilling machine 209 thereby halting its automatic drilling cycle.

In the preferred embodiment, digital processor 30 is a Honeywell 8080 A Microcomputer System. Keyboard/Display 60, cassette reader 40 and printer 50 can be any compatible peripherals, but in the preferred embodiment they are those peripherals named in reference #1 incorporated herein.

Figure 2:
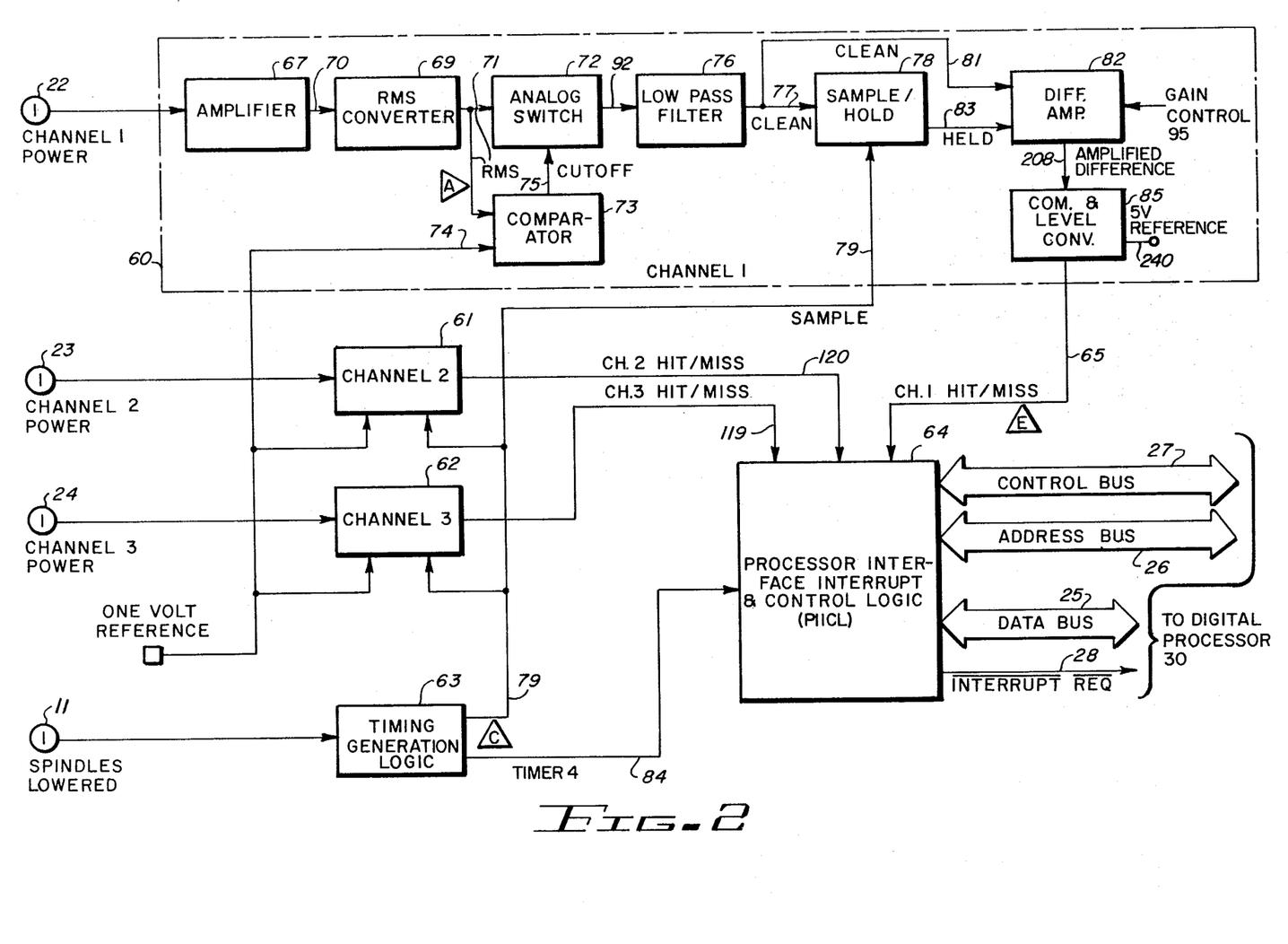
FIG. 2 is a block diagram of the drill monitor interface.

Referring now to FIG. 2, there is shown a block diagram of the functional units within drill monitor interface 20. Three channels 60, 61, and 62 of identical signal processing and comparison circuitry receive and process CHANNELS 1, 2 and 3 POWER signals 22, 23, 24 respectively. Timing generation logic 63 and processor interface interrupt and control logic 64 service all three channels. In the particular embodiment disclosed only three channels are shown but as many channels as there are spindles to be monitored may be used.

Each channel has a means for processing the signals from the sensors or motor current dropping resistors 21 similar to the channel 1 signal processing circuitry. This circuitry functions to prepare the CHANNEL 1 POWER signal on line 22 for comparison to itself at a time just prior to drill bit entry and again a short time after entry. After the comparison a CH.1 HIT/MISS signal is generated on line 65 connected to processor interface interrupt and control logic (PIICL) 64. PIICL 64 sends an INTERRUPT REQ signal on line 28 to the digital processor 30 shown in FIG. 1.

Upon receipt of the INTERRUPT REQ signal, digital processor 30 is forced by its own interrupt logic to branch to the particular address in memory where the first instruction of the subroutine designed to handle that particular interrupt may be found. The drill monitor interface subroutine will address the drill monitor interface 20, read the HIT/MISS signals for each channel from the data bus, examine them for misses, and then take the appropriate action depending upon the results of the examination.

Figure 3:
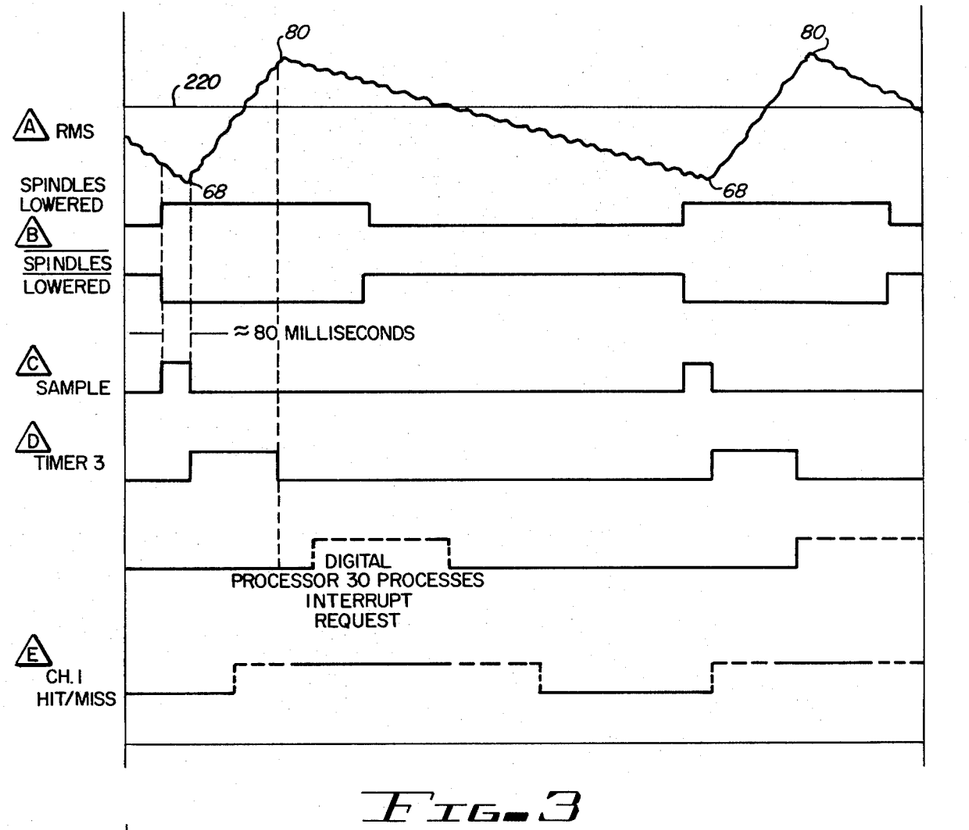
FIG. 3 is a timing diagram showing the timing relationships of various signals relevant to the operation of the system.

Generation of the HIT/MISS signal for each channel is accomplished as follows. An amplifier 67 receives the CHANNEL 1 POWER signal on line 22 from the motor current dropping resistor 21 (FIG. 1). The signal is an AC voltage because the phase currents through motor current dropping resistors 21 are AC. Amplifier 67 amplifies the CHANNEL 1 POWER signal by a gain of twenty and outputs it to RMS converter 69 via line 70. RMS converter 69 converts the CHANNEL 1 POWER signal to its RMS value as the RMS signal on line 71. This RMS signal is illustrated in FIG. 3. It is seen that the RMS signal varies above and below a fixed voltage reference level-220. Points 68 in FIG. 3 illustrate the power dissipation in the spindle motor at the time of entry of the drill bit into the workpiece. Points on the curve to the right of points 68 show the power dissipation increase as drilling commences.

Figure 4:
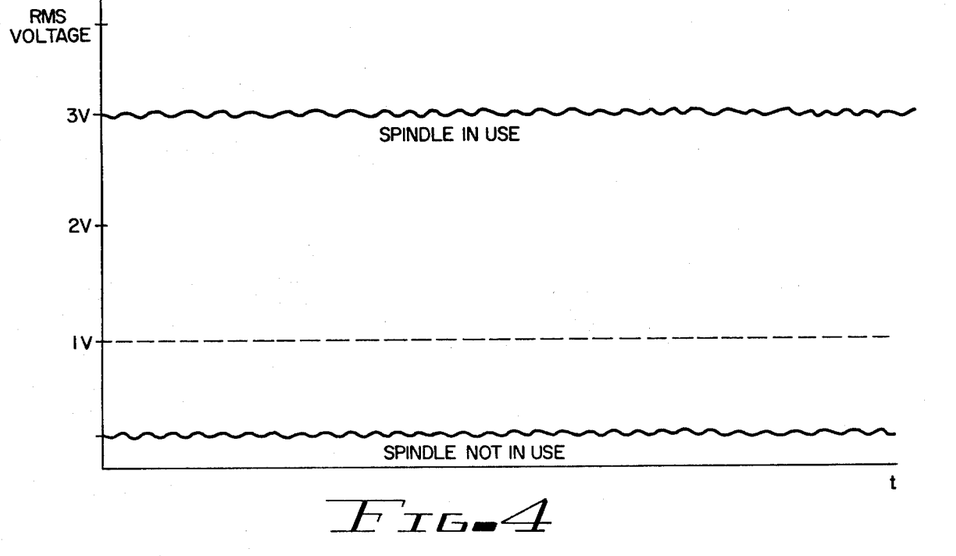
FIG. 4 is a waveform diagram showing the R.M.S. signal on line 71 both when the spindle is in use and when it is not in use.

The RMS signal on line 71 contains a considerable level of unwanted noise (not shown in FIG. 3). To eliminate this noise, the RMS signal is compared by comparator 73 against a one volt reference voltage on line 74. Analog switch 72 blocks transmission of the RMS signal through to line 92 if comparator 73 sends a CUTOFF signal over line 75 upon determination that the RMS signal is less than a predetermined value of one volt. The RMS signal will drop below one volt when the drill spindle motor for the channel in question is not in use. Referring to FIG. 4, there is shown typically the relative values of the RMS signal on line 71 out of RMS converter 69 when a drill spindle motor is either in use (top waveform) or when it is not in use (bottom waveform). The bottom waveform represents noise picked up from other drill spindle motors by inductive coupling and other phenomena. The comparator/analog switch arrangement prevents noise generated by other drill spindle motors from being interpreted as a valid signal.

Since high frequency noise will still be present in the RMS signal, a 2 Hertz low pass filter 76 is employed to filter out high frequency noise and leave a clean RMS signal (CLEAN) on line 77 to sample/hold module 78.

The function of sample/hold module 78 is to sample and hold the value of CLEAN when a SAMPLE signal is received on line 79 from timing generation logic 63.

The relationship between this SAMPLE signal, the SPINDLES LOWERED signal on line 11 from limit switch 10 and the CHANNEL 1 POWER signal on line 22 is depicted in FIG. 3. As noted earlier, points to the right of points 68 on the RMS curve show the rapid increase in the spindle motor current as the drill bit drills the hole until completion at points 80. Points to the right of points 80 indicate the gradual decline in spindle motor current after completion of the hole. As seen in FIG. 3 at line B, the SPINDLES LOWERED signal derived from the Hall Effect limit switch 10 in FIG. 1 goes low approximately 80 milliseconds before the drill bit contacts the workpiece. When SPINDLES LOWERED goes low, timing generation logic 63 in FIG. 2, generates a SAMPLE pulse on line 79 which is seen in FIG. 3 to go high when SPINDLES LOWERED goes low. Receipt of SAMPLE by sample/hold module 78 causes the value of the CLEAN signal to be tracked and stored when SAMPLE goes low. Meanwhile the value of CLEAN will be rising as the CHANNEL 1 POWER signal rises because of drilling load on the drill bit. Line 81 carries this rising CLEAN signal to a first differential amplifier 82 where it is compared to the HELD signal on line 83 and where the difference between the HELD signal (no load CLEAN signal) and the CLEAN signal (after loading) is amplified. The output signal amplified DIFFERENCE on line 208 is compared against a five volt reference and converted to a CH.1 HIT/MISS signal on line 65 by a second means for comparing in the form of comparator and level converter 85. These HIT/MISS signals from each channel are high when the five volt reference is exceeded as illustrated at line E of FIG. 3.

Referring again to FIG. 2, it is seen that timing generation logic 63 also sends a TIMER 4 signal on line 84 to a means for interfacing with digital processor 30 in the form of PIICL 64. PIICL 64 serves to receive the HIT/MISS signals from the comparator and level converter 85 and store them until digital processor 30 reads them via data bus 25. PIICL 64 also serves to send INTERRUPT REQ over line 28 in FIGS. 2 and 5B upon receiving TIMER 4 from timing generation logic 63. INTERRUPT REQ will not be transmitted until TIMER 4 has been received and the HIT/MISS signals have been received and stored. Further, INTERRUPT REQ will not be transmitted until INTERRUPT EN on line 230 in FIG. 5B has been set. This occurs after PIICL 64 has been initially addressed and defined by the software upon initialization of the system.

Figure 5A:
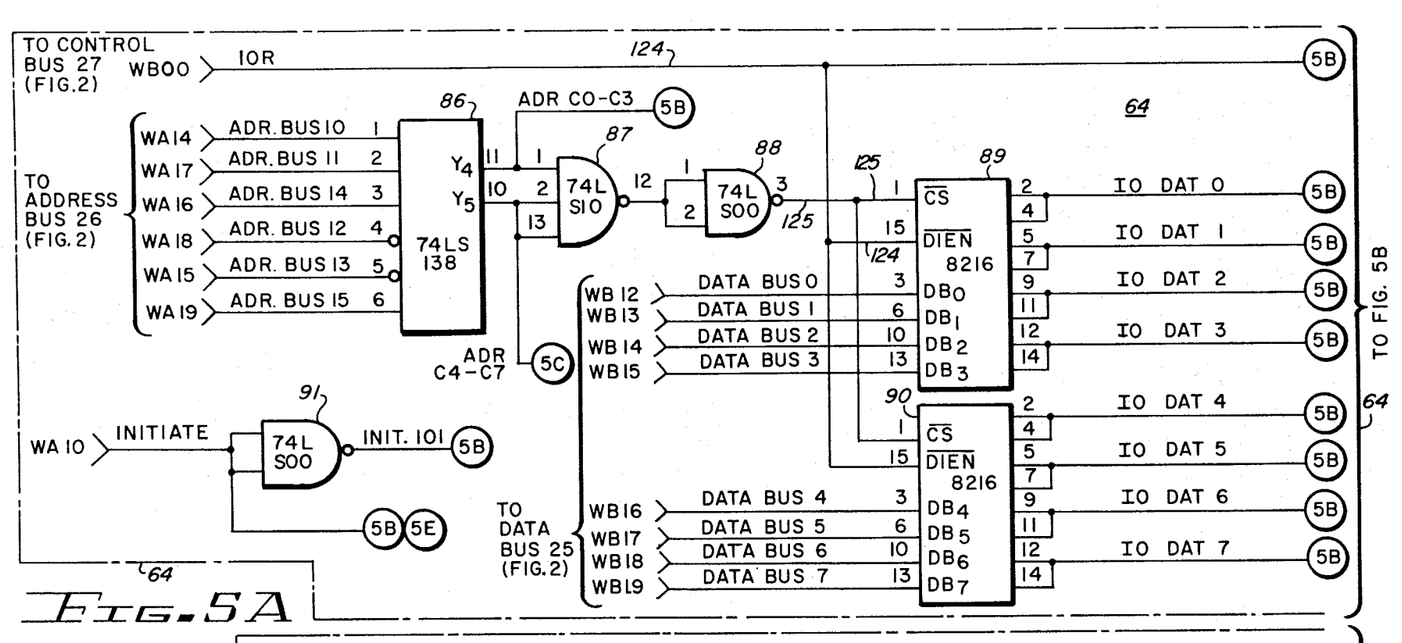
FIGS. 5A-F are the logic diagram for the drill monitor interface.
Figure 5B:
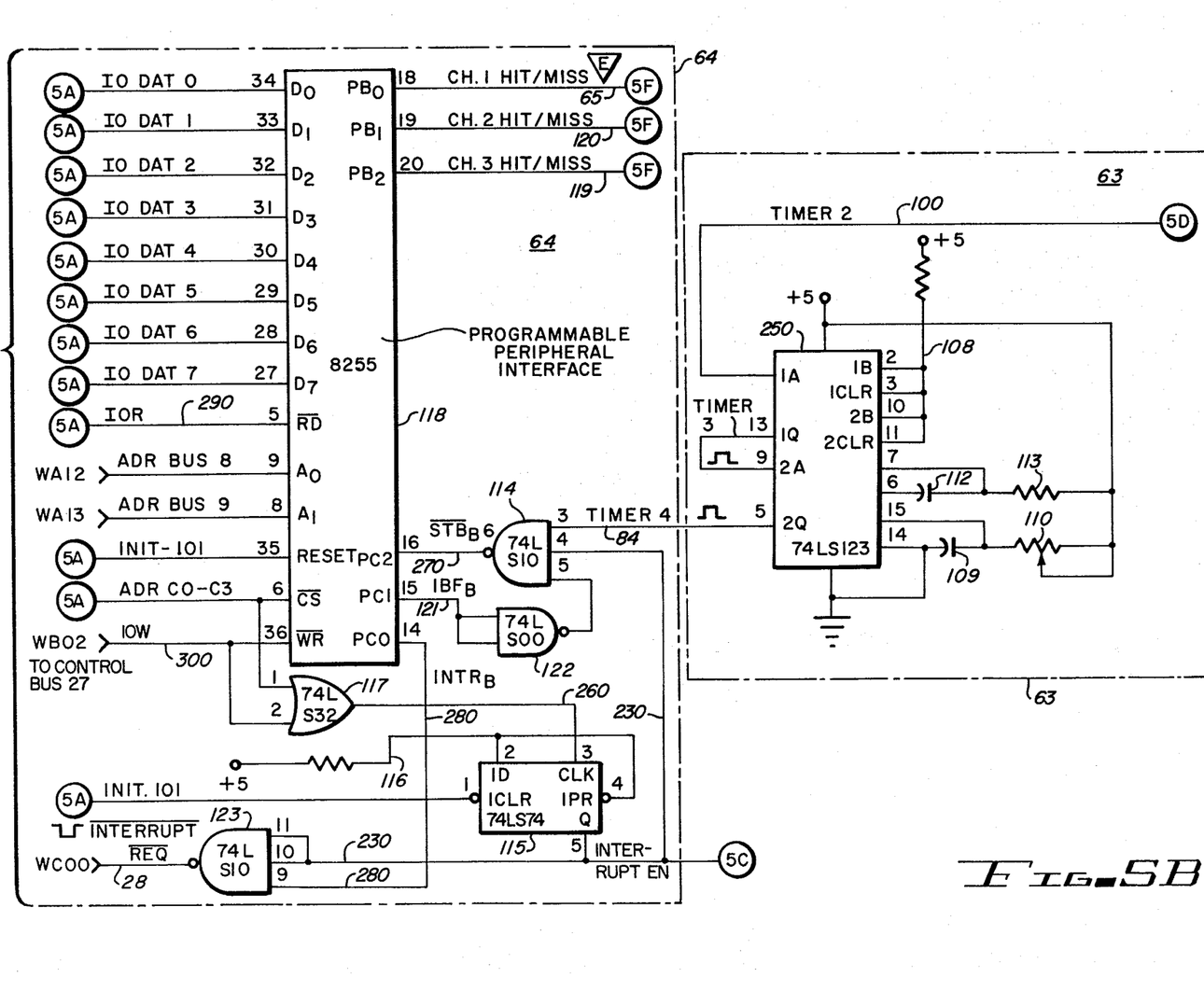

Referring to FIGS. 3 and 5B, it is seen that TIMER 3 goes high when SAMPLE goes low and lasts until cessation of drilling. TIMER 3 is related to INTERRUPT REQ in a way which will be detailed later by suffice it to say now that INTERRUPT REQ goes low shortly after the downward transition of TIMER 3 which causes digital processor 30 to service the interrupt request. During the time interval to the right of point 68 the HIT/MISS signals for each channel are generated by comparators and level converters similar to 85 in FIG. 2. Exactly when the HIT/MISS signal goes high depends upon when the DIFFERENCE signal on line 83 in FIG. 2 exceeds five volts. If a "hit" occurs, HIT/MISS will be high sometime during the time when digital processor 30 processes the interrupt request. If any HIT/MISS is low that is supposed to be high, a STOP signal is sent to the numerically-controlled drilling machine on line 29 in FIG. 1 and an error message is displayed on keyboard/display 60 alerting the operator of a problem.

Figure 5C:
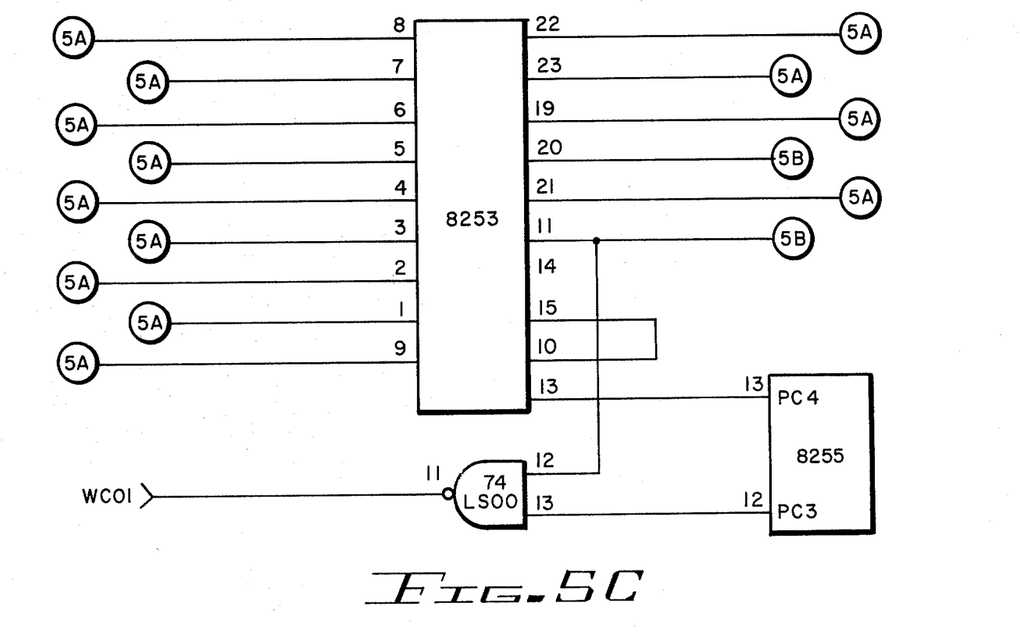
Figure 5D:
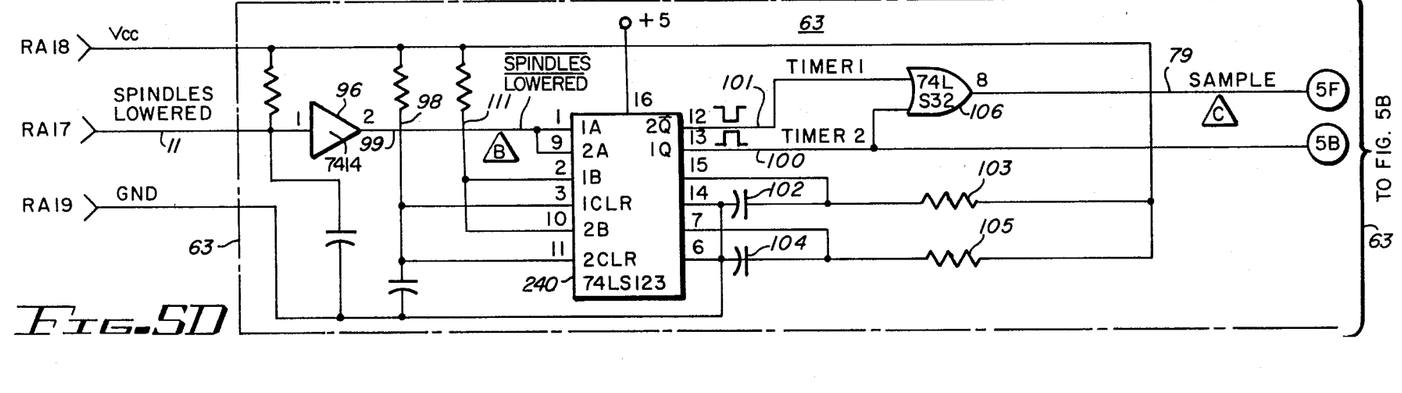
Figure 5E:
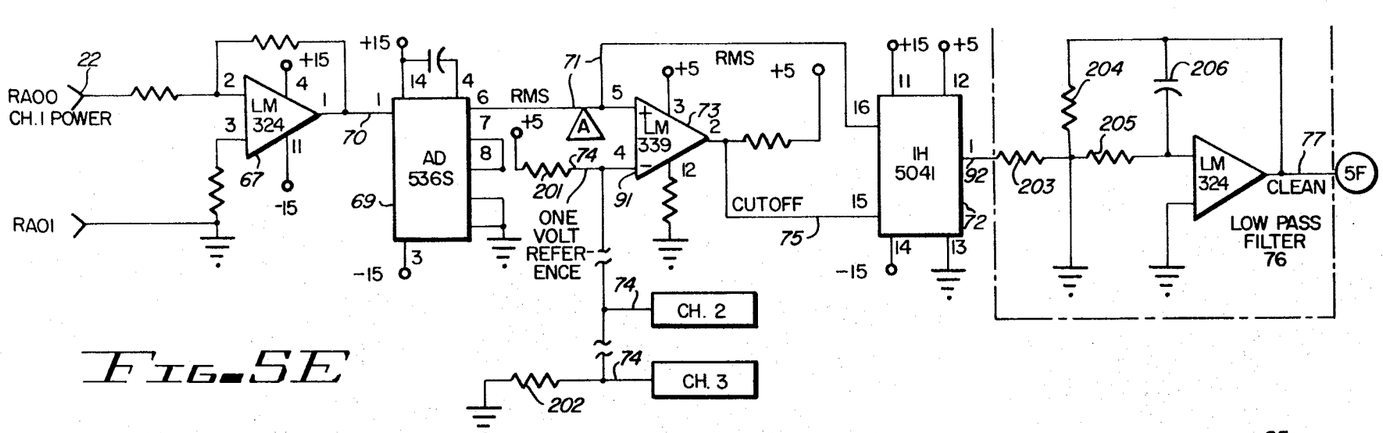
Figure 5F:
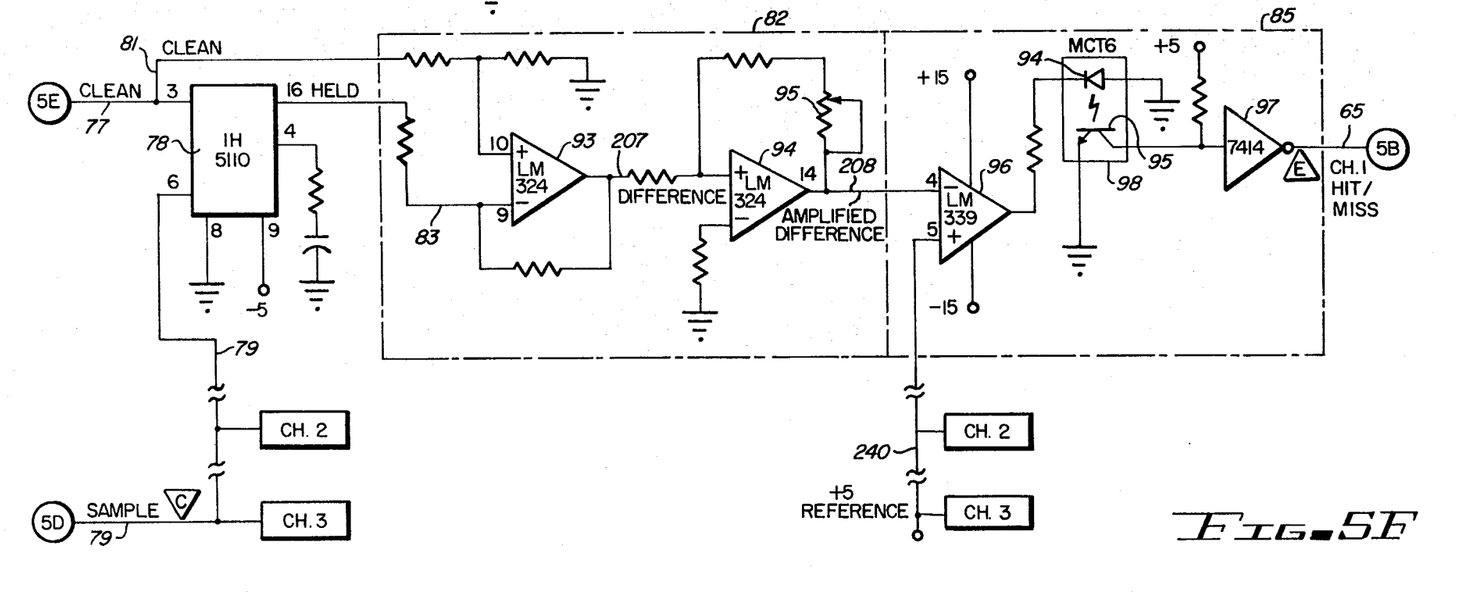

Referring now to FIGS. 2, 5E and 5F, there is shown a more detailed circuit diagram of the linear portions of the drill monitor interface. The circuitry in FIG. 5E is designed to process the incoming CH.1 POWER signal by amplifying it, converting it to its RMS value, filtering out high frequency noise, and blocking transmission of the RMS signal if it is less than the predetermined threshold by one volt.

Operational amplifier 67 receives the CHANNEL 1 POWER signal from the motor current dropping resistors 21. Op amp 67 can be a National Semiconductor LM324. The output of operational amplifier 67 is directed on line 70 to the input of RMS converter 69 which can be an Analog Devices AD536J. There the AC waveform is converted to its RMS value.

The RMS signal at the output of RMS converter 69 is directed via line 71 to the positive input of comparator 73 which can be a National LM339. There the RMS signal is compared against a one volt reference signal at negative input 91 derived from a resistor divider network comprised of resistors 201 and 202. If RMS does not exceed one volt, a CUTOFF signal is directed on line 75 to analog switch 72.

RMS is also directed from RMS converter 69 to analog switch 72 by line 71. If no CUTOFF signal is present, then analog switch 72 passes RMS through to low pass filter 76 via line 92. Low pass filter 76 utilizes a National LM324 operational amplifier with an appropriate resistor-capacitor network comprised of resistors 203, 204, 205 and capacitor 206. In filter 76, high frequency noise above 2 Hertz is filtered out leaving the CLEAN signal on line 77 to sample/hold module 78.

Since a comparison of the CLEAN signal to itself at two different times needs to be made, some means for sampling CLEAN and holding it for a short time is necessary. Sample/Hold module 78 serves this purpose and can be an Intersil IH5110. It functions to hold the value of the CLEAN signal on line 77 at output line 83 as the HELD signal when the SAMPLE signal on line 79 is low. Line 79 comes from timing generation logic 63 in FIG. 5D.

The HELD signal is then compared to the CLEAN signal. Differential amplifier 82 serves to perform this function. HELD is transferred via line 83 to the negative input of the first differential amplifier 93 of differential amplifier 82. The positive input of differential amplifier 93 is connected to the changing CLEAN signal output of low pass filter 76 via line 81. Thus differential amplifier 93, which can be a National Semi-conductor LM324, amplifies the difference between HELD and CLEAN and generates an output DIFFERENCE. The DIFFERENCE signal is applied via line 207 to the positive input of a second amplifier 94 the negative input of which is tied to ground. Differential amplifier 94 has a variable gain depending upon the setting of gain control 95.

Some means is needed to examine the AMPLIFIED DIFFERENCE signal to decide whether the difference is great enough to indicate a "hit" i.e. mechanical loading occurred. Comparator and level converter 85 performs this function. An AMPLIFIED DIFFERENCE signal is applied via line 208 to the negative input of comparator 96 in comparator and level converter 85. The positive input of comparator 96 is tied to a positive five volt reference 240. If the AMPLIFIED DIFFERENCE signal on line 208 exceeds five volts, light emitting diode 94 is turned on which turns on the light activated transistor 95 in optical isolator 98 which can be a Monsanto MCT6. The purpose of optical isolator 98 is to isolate the linear portions of the circuit from the digital portions and to convert the voltage level of difference comparator 96 to a TTL level signal. Light emitting diode 94 is energized when the output voltage of differential comparator 96 rises above a certain level indicating AMPLIFIED DIFFERENCE has exceeded the 5 volt reference 240. The light from light emitting diode 94 then turns on the transistor 96 which pulls the input of inverter 97 to ground causing a "high" CH.1 HIT/MISS signal on line 65. Inverter 97 can be a National 7414 which features a Schmitt trigger input to eliminate any indecisiveness with respect to whether transistor 96 is turned on or turned off.

The SAMPLE signal on line 79 in FIG. 5F comes from timing generation logic 63 in FIGS. 5D and 5B. In FIG. 5D, a SPINDLES LOWERED signal from limit switch 10 in FIG. 1 is received on line 11. This signal goes high when the drill bits start down, and is inverted by a Texas Instruments 7414 Schmitt trigger inverter 96. The $\overline{\text{SPINDLES LOWERED}}$ signal goes low on line 99 approximately eighty milliseconds prior to contact between the drill bit and the workpiece as seen in FIG. 3. Timing generation logic 63 consists of a pair of retriggerable monostable multivibrator chips 240 and 250 in FIGS. 5B and 5D which can be Texas Instruments 74LS123: ("one-shots"). Each chip contains two one-shots. The clear and "B" inputs on both one-shots of chip 240 are held high by lines 111 and 98 respectively. In this condition, a negative going transition at the "A" inputs of the one-shots on chip 240 will cause a positive going pulse to be emitted from their Q outputs and a negative going pulse to be emitted from their $\overline{Q}$ outputs. Thus when the $\overline{\text{SPINDLES LOWERED}}$ signal goes low a positive going TIMER 2 pulse will leave on line 100 from the 1Q output and a negative going TIMER 1 pulse will leave on line 101 from the $\overline{2Q}$ output. The respective pulse widths are established by the values of capacitor 102 in combination with resistor 103 and capacitor 104 in combination with resistor 105.

The TIMER 1 and TIMER 2 pulses are OR'd by gate 106 which results in the SAMPLE signal on line 79 going high for the duration of the shorter TIMER 2 pulse. SAMPLE will then go low at the end of TIMER 2 and will stay low for the duration of TIMER 1 which is a longer pulse. If the drilling machine is being constantly run, the second one shot on chip 240 $(\overline{2Q})$ is continuously retriggered and TIMER 1 never goes high. In this condition, SAMPLE goes high only when TIMER 2 is high. SAMPLE is output to sample hold network 78 in FIGS. 2 and 5F via line 79 where it causes the value of CLEAN to be tracked and then stored when SAMPLE goes low as of the time of theoretical drill bit contact with the workpiece.

TIMER 2 is also fed to another T.I. 74LS123 (250 FIG. 5B) via line 100 which chip comprises the second half of timing generation logic 63. Again 1B, 2B, 1 CLEAR and 2 CLEAR are held high by line 108 so that the negative transition of TIMER 2 triggers one shot number one via the 1A input. A positive going TIMER 3 pulse leaves from the 1Q output and is of variable pulse width by virtue of capacitor 102 in combination with variable resistor 110. The negative transition of TIMER 3 will trigger the 2A input of the second one shot which outputs a positive going TIMER 4 from the 2Q. The pulse width of TIMER 4 is determined by capacitor 112 and resistor 113. Some means for interfacing all these legion signals to digital processor 30 is needed. Processor interface interrupt and control logic 64 in FIG. 2 and FIGS. 5A and 5B serves this purpose. It is connected to the data, control, and address busses (25, 27, and 26 respectively) of digital processor 30. It is also connected to the interrupt request line of digital processor 30 and to the CHANNELS 1, 2, and 3 HIT/MISS signals on lines 65, 120 and 119 respectively. It also receives the TIMER 4 signal from timing generation logic 63 via line 84. PIICL 64 serves to store and buffer the three data bits comprising the HIT/MISS signals til digital processor 30 desires to read them via data bus 25. PIICL 64 sends $\overline{\text{INTERRUPT REQ}}$ on line 28 to digital processor 30 upon receipt and storage of the HIT/MISS signals and the TIMER 4 pulse providing the software has addressed the programmable peripheral interface chip 118 (Intel 8255) and defined its function. The HIT/MISS data bits will then be fed to digital processor 30 over data bus 25 (buffered IO DAT 0-7 in FIG. 5B) when digital processor 30 acknowledges the interrupt request and addresses the PIICL 64 via address bus 26 during a read instruction. The precise manner in which the above transfer occurs is as follows.

TIMER 4 enters one input of NAND gate 114. A second input of this gate is connected to the Q output of flip-flop 115 via line 230. Flip-flop 115 serves to enable the interrupt request by generating INTERRUPT EN on line 230 at its Q output. The ID and ICLR inputs of flip-flop 115 are held high by line 116 and INIT 101 from digital processor 30 control bus 27 stays high except that it goes low momentarily when the system is first powered up to disable any interrupt request. Thus an upward transition at the CLK input of flip-flop 115 will set the Q output. The CLK input is connected to the output of OR gate 117 which has input signals ADR C0-C3 and IOW. Both of these signals are asserted low with ADR C0-C3 going low when the drill monitor interface is addressed by assertion of hexadecimal addresses C0, C1, C2 or C3 on the address bus. IOW on line 300 from control bus 27 goes low when digital processor 30 writes data onto the data bus 15. The function of OR gate 117 and flip-flop 115 are to prevent interrupts to digital processor 30 before programmable peripheral interface 118 has been programmed or defined by the software. The software defines the operation of PPI 118 initially by executing a write instruction. The write instruction places address C3 on the address bus and the proper control word for the desired definition on the data bus. The control word defines operation in mode 1 for data transfer from Port B to the data bus. When this write instruction is executed, ADR C0-C3 will go low, IOW will go low, ADR bus 8 and 9, will be high (because the address is C3) and IOR will be high (asserted low). The output of OR gate 117 on line 260 will therefore be low but will go high when IOW goes high at the end of the PPI programming write instruction. INTERRUPT EN will be set upon the upward transition on line 260 allowing interrupts to digital processor 30 through NAND gate 114.

PPI 118, being programmed in the mode 1 input state as described above, must generate an interrupt to the CPU when the HIT/MISS signals on lines 65, 119 and 120 have been latched into port B. This latching is acknowledged by a high $IBF_B$ signal on line 121 and occurs when $\overline{STB_B}$ on line 270 goes low. $\overline{STB_B}$ will go low when INTERRUPT EN is high, $IBF_B$ is low and TIMER 4 goes high. When $\overline{STB_B}$ on line 270 goes low, $IBF_B$ goes high upon latching of the HIT/MISS signals verifying their reception. This, by the action of NAND gate 122, sends $\overline{STB_B}$ high and results in $INTR_B$ on line 280 being set. $INTR_B$ on line 280 and INTERRUPT EN on line 230 input to NAND gate 123 which sends $\overline{INTERRUPT\ REQ}$ low on line 28. Digital processor 30 will then enter and perform its interrupt routine to service the drill monitor interface.

A read instruction will be executed which causes IOR on line 290 to be asserted low. The read instruction will place address C1 (hex) on the data bus. This sends ADR C0-C3 low, ADR bus 8 high, ADR bus 9 low, and IOW on line 300 will remain high. This combination of control signals transfers the contents of the port B latches of 118 to the data bus on lines IO DAT 0-7.

Referring now to FIG. 5A, lines IO DAT 0-7 go to twin Intel 8216 data bus buffers 89 and 90. Buffers 89 and 90 are three state logic bidirectional bus drivers, the direction and time of data transfer being determined by the signals on lines 124 and 125 respectively. When 125 goes low during the read instruction of the interrupt routine serving the drill monitor, buffers 89 and 90 come out of their high impedance state and data transfer is enabled. Direction is determined by the signal on line 124, IOR. Both lines 124 and 125 must go low to enable a transfer of data over the DATA Bus 0-7 lines to digital processor 30. This occurs IOR goes low and when decoder 86, (Texas Instruments 74LS138) detects any of address C0-7 on the address bus 26. When C0-7 appear, either the $Y_4$ or $Y_5$ output goes low. When either $Y_4$ or $Y_5$ goes low, NAND gates 87 and 88 acting as an AND gate, send line 125 low. When line 125 is low and IOR on line 124 is low, direction of data transfer is set to be from the IO DAT 0-7 lines to the DATA BUS 0-7 lines.

FIG. 5C shows the connections of a programmable interval timer that is necessary for providing time interval and time of day data to the software for the efficiency report generation aspects of the system program.

Although the invention has been described in terms of the preferred embodiment, other embodiments employing a combination of apparatus utilizing the same teachings or doing substantially the same thing in substantially the same way are intended to be included.

For example the disclosed apparatus is not limited to use in drill motors but may be used to monitor any automatic motor driven equipment where there is a desire to detect if the motor is disengaged from its mechanical load. Similarly, instead of motor current dropping resistors for sensors, spindle velocity could be monitored with an optical or magnetic reluctance pickup as a means for detecting misses. Likewise an infrared scanner could be trained on the tip of each drill bit to monitor for a burst of heat when the drill bit contacts the surface of the substance drilled. Inclusion of an automatic gain control in the input amplifier stage would reduce the sensitivity of the circuit to individual spindle characteristics and eliminate the necessity for tuning the circuit whenever a spindle motor is replaced.

What is claimed is:

1. A motor monitor system comprising:
   (a) a numerically controlled machine to accomplish a task requiring repeated mechanical loading of an electric motor;
   (b) sensors responsive to changes in criteria indicative of whether mechanical loading of said electric motor has occurred and for generating a first signal;
   (c) a drill monitor interface responsive to said first signals for sampling said first signals at two times just prior to and again after the theoretical occurrence of the mechanical loading, and for comparing said first signals as sampled at said two times and for generating a hit/miss signal for said electric motor and for generating an interrupt request after generation of said hit/miss signal;
   (d) a means for predicting mechanical loading and informing said drill monitor interface when mechanical loading of said motor should occur for sending a second signal to said drill monitor interface informing it that mechanical loading should occur just after generation of said second signal;
   (e) a digital processor controlling a stop mechanism in said numerically controlled machine and electrically linked to said drill monitor interface for receiving said interrupt request and said hit/miss signal from said drill monitor interface and programmed to analyze said hit/miss signals for a miss by said electric motor and to issue a stop command to said numerically controlled machine upon detection of a miss.

2. A drill monitor system comprising:
   (a) a numerically controlled drilling machine to automatically drill at least one hole in a succession of workpieces utilizing at least one electric motor to drive a drill spindle holding a drill bit;
   (b) sensors responsive to changes in criteria indicative of whether each drill bit of said numerically controlled drilling machine has or has not entered the workpiece and for generating a first signal;
   (c) a drill monitor interface responsive to said sensors for processing the said first signals, sampling said first signals at a time just before and again after theoretical entry of the drill bit into a workpiece and for comparing said first signals and generating a hit/miss signal for each active drill spindle indicating whether drilling occurred and for generating an interrupt request after generation of said hit/miss signal;
   (d) a means for predicting load and for informing said drill monitor interface when mechanical loading should occur said means for predicting load responsive to the mechanical position of said drill spindled of said numerically controlled drilling machine and electrically linked to said drill monitor interface for sending a spindles lowered signal to said drill monitor interface just prior to entry of said drill bit into said workpiece;
   (e) a digital processor controlling a stop circuit of said numerically controlled drilling machine and electrically linked to said drill monitor interface for receiving said interrupt request and said hit/miss signals and programmed to analyze said hit/miss signals for a miss by any operating drill spindle and to issue a stop command to said numerically controlled drilling machine upon detection of a miss.

3. An apparatus as defined in claim 1 or 2 wherein said sensors are a means for generating data indicating the magnitude of motor current through said electric motor.

4. An apparatus as defined in claim 1 or 2 wherein said sensors are optical pickups to monitor shaft RPM of said electric motor.

5. An apparatus as defined in claim 1 or 2 wherein said sensors are magnetic reluctance pickups to monitor shaft speed of said electric motor.

6. An apparatus as defined in claim 2 wherein said sensors are means for detecting bursts of infrared radiation from the tips of said drill bits.

7. An apparatus as defined in claim 1 or 2 or 3 or 4 or 5 or 6 wherein said drill monitor interface further comprises:

(a) a means for processing said signals and said sensors to amplify, convert to an RMS value, and eliminate high frequency noise from said signals and block transmission of the RMS signal if said RMS signal is less than a predetermined value;

(b) a means for sampling and holding the output signal from said means for processing upon receipt of a SAMPLE signal;

(c) a first means for comparing the output of the means for sampling and holding to the most recent output of said means for processing and amplifying the difference;

(d) a second means for comparing the output of said first means for comparing to a fixed voltage reference source and for generating a hit/miss signal which indicates when the output of said first means for comparing exceeds the fixed voltage reference;

(e) a timing generation logic means responsive to the signal from said means for predicting load and electrically linked to said means for sampling, said timing generation logic for generation of said SAMPLE signal after receipt of said signal from said means for predicting load and for generating a TIMER 4 signal;

(f) a means for interfacing with said digital processor responsive to said second means for comparing and electrically linked to said timing generation logic and to the data, address and control buses and the interrupt request line of said digital processor said means for interfacing for transmitting an INTERRUPT REQ signal over said interrupt request line upon receipt and storage of said hit/miss signal and said TIMER 4 signal and for transmitting said hit/miss signals to said digital processor over said data bus when said digital processor sends a predetermined address to said means for interfacing over said address bus.

8. A circuit for detecting and signaling when an electric motor fails to become mechanically loaded comprising:

(a) a sensor means for sensing changes in any criteria indicative of the presence of a mechanical load on an electric motor and for generating a first signal indicative of the status of said criteria;

(b) a means for predicting load and for generating a second signal indicating that mechanical loading of said electric motor should occur momentarily;

(c) a motor monitor interface means for receiving said first and second signals and for sampling and holding said first signal at the time of receipt of said second signal, and for comparing the characteristics of said first signal at a time after mechanical loading should have occurred to the characteristics of said first signal as held at the time of receipt of second signal and for generating a hit/miss signal indicating whether mechanical loading actually occurred.

9. A circuit for detecting and signaling when an electric motor fails to become mechanically loaded comprising:

(a) a sensor means for sensing changes in any criteria indicative of the presence of a mechanical load on an electric motor and for generating a first signal indicative of the status of said criteria;

(b) a means for predicting load and for generating a second signal indicating that mechanical loading of said electric motor should occur momentarily;

(c) a motor monitor interface means for receiving said first and second signals and for generation of a hit/miss signal indicating whether mechanical loading actually occurred comprising:

(1) a means for processing said first signal to eliminate high frequency noise and to block transmission if said first signal falls below a predetermined level;

(2) a means for sampling and holding the output of said means for processing upon receipt of said second signal;

(3) a means for comparing the characteristics of said first signal as held by said means for sampling and holding to the characteristics of said first signal at a time after mechanical loading should have occurred.

(4) a means generating a hit/miss signal responsive to the output of said means for comparing, said hit/miss signal indicating whether mechanical loading actually occurred.

10. A circuit for detecting and signaling when an electric motor fails to become mechanically loaded comprising:

(a) a motor current dropping resistor electrically connected in the power circuit of said electric motor so as to generate a voltage across said resistor proportional to the power being consumed in said motor, said voltage drop constituting a first signal;

(b) a limit switch responsive to the mechanical engagement between said electric motor and its mechanical load for generating a second signal indicating mechanical loading is about to occur;

(c) a means for receiving said first and second signals and for generating a hit/miss signal comprising:

(1) an amplifier to amplify said first signal;

(2) an RMS converter to convert the output of said amplifier to its RMS value;

(3) comparator to compare the output of said RMS converter to a fixed voltage reference source and to generate a cutoff signal when said RMS value is exceeded by said fixed voltage reference;

(4) an analog switch responsive to said cutoff signal and electrically linked to the output of said RMS converter to prevent transfer of said RMS value to the output of said analog switch upon receipt of said cutoff signal;

(5) a low pass filter for filtering noise above a predetermined cutoff frequency from the output of said analog switch;

(6) a sample/hold circuit for sampling and holding the output of said low pass filter upon receipt of a sample signal;

(7) timing generation logic for receiving said second signal from said limit switch and for generating said sample signal thereafter indicating mechanical loading is about to occur and causing said sample/hold circuit to sample and hold the output signal from said low pass filter and for generating a TIMER 4 signal at some predetermined time following generation of said sample signal;

(8) a differential amplifier to amplify the difference between the output of said low pass filter after mechanical loading has theoretically occurred and the output of said sample/hold circuit as held at the time of receipt of said sample signal;

(9) a comparator to compare the output of said differential amplifier to a fixed voltage reference and to generate a hit/miss signal which is true when the fixed voltage reference has been exceeded indicating that the power consumed in said electric motor has increased due to mechanical loading over the power consumed under no load;

(10) processor interface interrupt and control logic means for receiving said hit/miss signal and said TIMER 4 signal and for generating an interrupt request for use by a digital processor after receipt and storage of said hit/miss signal.

11. A method of detecting when mechanical loading of an electric motor did not occur comprising:
   (a) sensing changes in any criteria indicating the presence of mechanical loading of said electric motor and generating a first signal indicating the status of said criteria;
   (b) sensing when mechanical loading should occur and generating a second signal;
   (c) comparing the most recent value of said first signal to the value of said first signal as it was at the time of receipt of said second signal;
   (d) generating a hit/miss signal which is true when the comparison of step (c) indicates said first signal has changed in a manner indicating loading has occurred and false when loading has not occurred.

12. The method of claim 11 where step (a) further comprises sensing changes in the shaft speed of said electric motor.

13. The method of claim 11 where step (a) further comprises the step of sensing power dissipation in said electric motor by sensing the voltage drop across a motor current dropping resistor connected in the power supply circuit of said electric motor.

14. A method of detecting when drilling through a workpiece by a numerically controlled drilling machine does not occur comprising:
   (a) sensing changes in electrical power dissipation in said electric motor and generating a first signal indicative of said power dissipation changes;
   (b) sensing when a drill spindle holding a drill bit driven by said numerically controlled drilling machine approaches said workpiece and generating a second signal indicating drilling, if any, is about to commence;
   (c) sampling and holding the value of said first signal as of the time of receipt of said second signal;
   (d) comparing the value of said first signal after receipt of said second signal to the value of said first signal as held in step (c) above it at the time of receipt of said second signal;
   (e) stopping said numerically controlled drilling machine if the comparison of step (d) above indicates said first signal has not appreciably changed indicating no drilling has occurred.

* * * * *